United States Patent
Oidemizu et al.

(10) Patent No.: US 11,657,651 B2
(45) Date of Patent: May 23, 2023

(54) INFORMATION PROCESSING APPARATUS, INFORMATION PROCESSING SYSTEM, AND INFORMATION PROCESSING METHOD

(71) Applicant: TOYOTA JIDOSHA KABUSHIKI KAISHA, Toyota (JP)

(72) Inventors: Takayuki Oidemizu, Nagakute (JP); Kazuyuki Inoue, Nagoya (JP); Ryosuke Kobayashi, Nagakute (JP); Yurika Tanaka, Yokosuka (JP); Tomokazu Maya, Nagoya (JP); Satoshi Komamine, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 62 days.

(21) Appl. No.: 17/406,897

(22) Filed: Aug. 19, 2021

(65) Prior Publication Data

US 2022/0058379 A1    Feb. 24, 2022

(30) Foreign Application Priority Data

Aug. 20, 2020   (JP) .............................. JP2020-139649

(51) Int. Cl.
| | | |
|---|---|---|
| *G06V 40/20* | (2022.01) | |
| *G06V 20/30* | (2022.01) | |
| *G06V 20/52* | (2022.01) | |
| *G06V 40/10* | (2022.01) | |

(52) U.S. Cl.
CPC .............. *G06V 40/20* (2022.01); *G06V 20/30* (2022.01); *G06V 20/53* (2022.01); *G06V 40/10* (2022.01)

(58) Field of Classification Search
None
See application file for complete search history.

(56) References Cited

U.S. PATENT DOCUMENTS

| | | | | |
|---|---|---|---|---|
| 2016/0335484 | A1* | 11/2016 | Xie ........................ | H04N 7/181 |
| 2018/0124360 | A1* | 5/2018 | Okuda ..................... | G06T 7/246 |
| 2019/0354777 | A1* | 11/2019 | Beck ....................... | G06V 20/52 |

(Continued)

FOREIGN PATENT DOCUMENTS

| | | |
|---|---|---|
| CN | 110443152 A | * 11/2019 |
| JP | 2019-095552 A | 6/2019 |

(Continued)

OTHER PUBLICATIONS

Lim, Jian Han, et al. "Automated classroom monitoring with connected visioning system." 2017 Asia-Pacific Signal and Information Processing Association Annual Summit and Conference (APSIPA ASC). IEEE, 2017. (Year: 2017).*

(Continued)

*Primary Examiner* — Michelle M Entezari
(74) *Attorney, Agent, or Firm* — Oliff PLC (57) ABSTRACT

An information processing apparatus monitors a plurality of persons on a premises by one or more image sensors installed on the premises. The information processing apparatus includes a controller configured to determine a tendency of behavior of at least one person of the plurality of persons according to a length of a blank time, the blank time being a time during which the at least one person does not appear in an image captured by the one or more image sensors.

7 Claims, 4 Drawing Sheets

(56) References Cited

U.S. PATENT DOCUMENTS

| | | | | |
|---|---|---|---|---|
| 2020/0014885 | A1* | 1/2020 | Carey | G08B 15/004 |
| 2020/0184202 | A1* | 6/2020 | Suzuki | H04N 23/54 |
| 2020/0327313 | A1* | 10/2020 | Kedarisetti | G06V 40/20 |
| 2020/0327315 | A1* | 10/2020 | Mullins | G08B 13/1968 |
| 2020/0387719 | A1* | 12/2020 | Jung | G06F 18/22 |
| 2021/0304634 | A1* | 9/2021 | Juliano | G09B 19/00 |

FOREIGN PATENT DOCUMENTS

| | | | | |
|---|---|---|---|---|
| KR | 10-0878692 B1 | * | 1/2009 | |
| WO | WO-2020138736 A1 | * | 7/2020 | G03B 17/561 |

OTHER PUBLICATIONS

Bosse, Tibor, et al. "Development and validation of an agent-based simulation model of juvenile delinquency." 2009 International Conference on Computational Science and Engineering. vol. 4. IEEE, 2009. (Year: 2009).*

Zhang T, Aftab W, Mihaylova L, Langran-Wheeler C, Rigby S, Fletcher D, Maddock S, Bosworth G. Recent Advances in Video Analytics for Rail Network Surveillance for Security, Trespass and Suicide Prevention—A Survey. Sensors. Jan. 2022;22(12):4324. (Year: 2022).*

CN110443152A Machine Translation (Year: 2019).*

Sidhu, Robin Singh, and Mrigank Sharad. "Smart surveillance system for detecting interpersonal crime." 2016 International Conference on Communication and Signal Processing (ICCSP). IEEE, 2016. (Year: 2016).*

Niu, Wei, et al. "Human activity detection and recognition for video surveillance." 2004 IEEE international conference on multimedia and expo (ICME)(IEEE Cat. No. 04TH8763). vol. 1. IEEE, 2004. (Year: 2004).*

KR 10-0878692 B1 [Machine Translation] (Year: 2009).*

Clark VN. Automated visual surveillance using hidden markov models. InInternational conference on vision interface 2002 (pp. 88-93). (Year: 2002).*

Raudies, Florian, and Heiko Neumann. "A bio-inspired, motion-based analysis of crowd behavior attributes relevance to motion transparency, velocity gradients, and motion patterns." PLoS One 7.12 (2012): e53456. (Year: 2012).*

Kitahara I. Interactive video surveillance by using environmental and mobile cameras. In2008 World Automation Congress Sep. 28, 2008 (pp. 1-6). IEEE. (Year: 2008).*

WO 2020/138736 A1 [Machine Translation] (Year: 2020).*

Sutjarittham T, Gharakheili HH, Kanhere SS, Sivaraman V. Experiences with IoT and AI in a smart campus for optimizing classroom usage. IEEE Internet of Things Journal. Mar. 1, 2019;6(5):7595-607. (Year: 2019).*

* cited by examiner

INFORMATION PROCESSING APPARATUS, INFORMATION PROCESSING SYSTEM, AND INFORMATION PROCESSING METHOD

CROSS-REFERENCE TO RELATED APPLICATION

This application claims priority to Japanese Patent Application No. 2020-139649, filed on Aug. 20, 2020, the entire contents of which are incorporated herein by reference.

TECHNICAL FIELD

The present disclosure relates to an information processing apparatus, an information processing system, and an information processing method.

BACKGROUND

Patent Literature (PTL) 1 describes technology for detecting the occurrence of a predetermined event related to a sign of bullying based on a voice in a classroom, and specifying a victim or a related person based on, for example, the occurrence place of the event.

CITATION LIST

Patent Literature

PTL 1: JP 2019-095552 A

SUMMARY

According to the technology described in PTL 1, the sign of bullying cannot be determined when the event occurs outside the classroom. In order to reliably determine the sign of bullying, it is necessary to collect voices throughout the school.

It would be helpful to determine a tendency of behavior of persons in a premises without having to monitor the premises thoroughly.

An information processing apparatus according to the present disclosure is configured to monitor a plurality of persons in a premises by one or more image sensors installed on the premises, the information processing apparatus including a controller configured to determine a tendency of behavior of at least one person of the plurality of persons according to a length of a blank time, the blank time being a time period during which the at least one person does not appear in an image captured by the one or more image sensors.

An information processing method according to the present disclosure is for monitoring a plurality of persons by an information processing apparatus based on an image obtained by capturing a premises by one or more image sensors installed on the premises, the information processing method including determining, by the information processing apparatus, a tendency of behavior of at least one person of the plurality of persons according to a length of a blank time, the blank time being a time period during which the at least one person does not appear in the image.

An information processing system according to the present disclosure includes:

one or more image sensors installed on a premises; and an information processing apparatus configured to monitor a plurality of persons on the premises by the one or more image sensors, the information processing apparatus being configured to determine a tendency of behavior of the at least one person according to a length of a blank time, the blank time being a time period during which at least one of the plurality of persons does not appear in an image captured by the one or more image sensors.

The present disclosure enables to determine a tendency of behavior of persons in a premises without having to monitor the premises thoroughly.

DETAILED DESCRIPTION

Hereinafter, an embodiment of the present disclosure will be described with reference to the drawings.

In the drawings, the same or corresponding portions are denoted by the same reference numerals or symbols. In the descriptions of the present embodiment, detailed descriptions of the same or corresponding portions are omitted or simplified, as appropriate.

Figure 1:
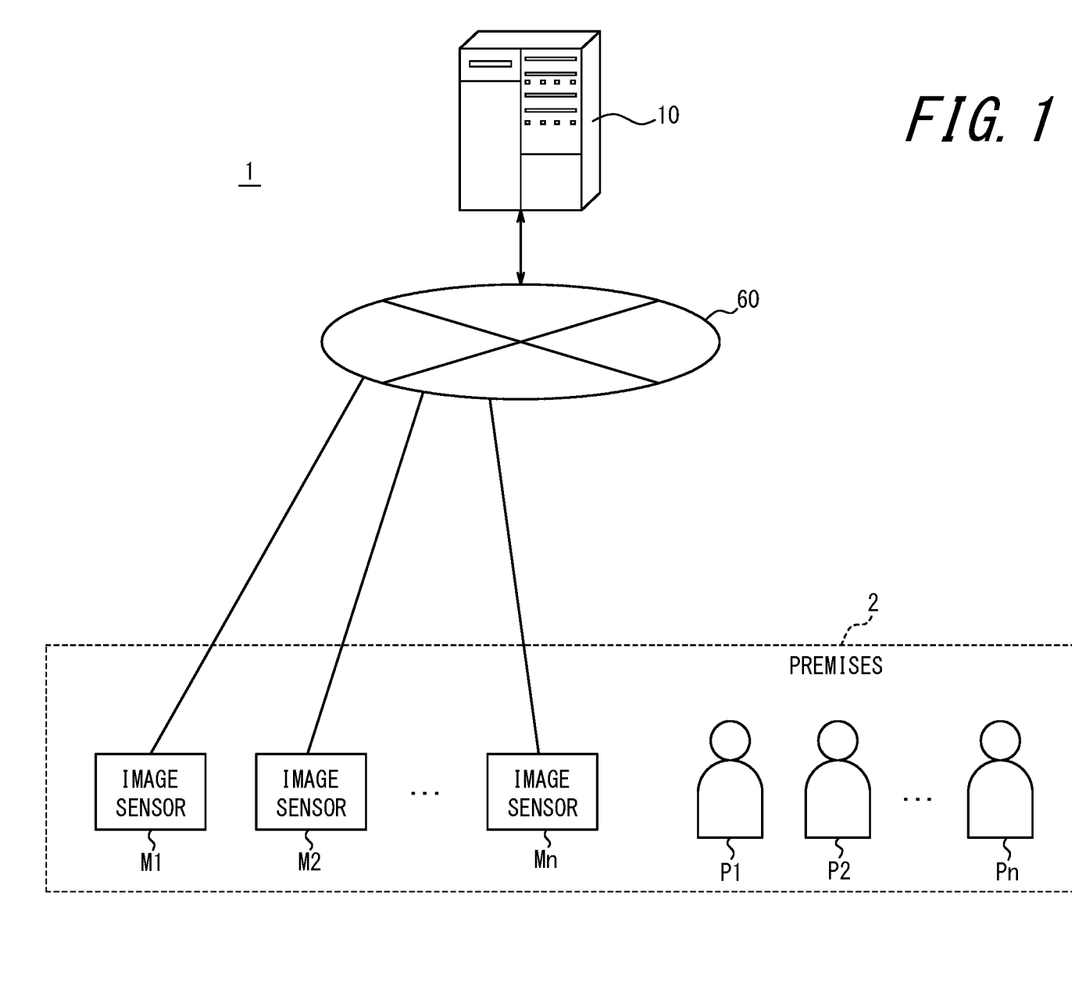
FIG. 1 is a diagram illustrating a configuration of an information processing system according to an embodiment of the present disclosure.

A configuration of an information processing system 1 according to the present embodiment will be described with reference to FIG. 1.

The information processing system 1 according to the present embodiment includes two or more image sensors M1, M2, . . . , Mn, and an information processing apparatus 10. The information processing system 1 includes two or more image sensors in the present embodiment, but may include one image sensor.

The information processing apparatus 10 can communicate with each of the image sensors M1, M2, . . . , Mn, via a network 60.

The network 60 includes the Internet, at least one WAN, at least one MAN, or a combination thereof. The term "WAN" is an abbreviation of wide area network. The term "MAN" is an abbreviation of metropolitan area network. The network 60 may include at least one wireless network, at least one optical network, or a combination thereof. The wireless network is, for example, an ad hoc network, a cellular network, a wireless LAN, a satellite communication network, or a terrestrial microwave network. The term "LAN" is an abbreviation of local area network.

The information processing apparatus 10 is located in a facility, such as a data center. The information processing apparatus 10 is, for example, a server that belongs to a crowd computing system or another computing system.

The image sensors M1, M2, . . . , Mn are installed dispersedly in a premises 2 and configured to monitor a plurality of persons P1, P2, ..., Pn in the premises 2. In the present embodiment, the image sensors M1, M2, ..., Mn are configured as a camera such as a network camera or an IP camera. The term "IP" is an abbreviation for internet protocol. The image sensors M1, M2, ..., Mn may be configured as a drone equipped with a camera capable of photographing the premises 2 and its periphery from the air, instead of being installed within the premises 2.

An image to be captured by each of the image sensors M1, M2, ..., Mn is a moving image in the present embodiment, but may be a still image. In the present embodiment, the image sensors M1, M2, ..., Mn are each configured as a surveillance camera.

The image sensors M1, M2, ..., Mn may further include a voice input function to collect a voice generated in the premises 2, in addition to the captured image. The voice input function is implemented, for example, as a recorder such as a microphone. The image sensors M1, M2, ..., Mn, when provided with the voice input function, can acquire a voice generated by, for example, at least one person Px of the persons P1, P2, ..., Pn within the premises 2. As a modification of the present embodiment, the information processing system 1 may include a sensor having a voice input function, separately from the image sensors M1, M2, ..., Mn.

In the present embodiment, there is a "blind spot" in the premises 2. The blind spot is a range an image of which cannot be captured by any of the image sensors M1, M2, ..., Mn. In the present embodiment, the range corresponding to the blind spot is outside a classroom, behind a gymnasium, or inside a restroom stall. When at least one person Px of the persons P1, P2, ..., Pn enters the blind spot in the premises 2, the at least one person Px does not appear in an image captured by the image sensors M1, M2, ..., Mn.

An outline of the present embodiment will be described with reference to FIG. 1.

In the information processing system 1 according to the present embodiment, the image sensors M1, M2, ..., Mn installed on the premises 2 captures an image of the premises 2. The information processing apparatus 10 monitors the plurality of persons P1, P2, ..., Pn, based on an image captured by the image sensors M1, M2, ..., Mn. The information processing apparatus 10 determines a tendency of behavior of at least one person Px of the plurality of persons P1, P2, Pn according to the length of a blank time, the blank time being a time period during which the at least one person Px does not appear in an image captured by the one or more image sensors M1, M2, ..., Mn.

The present embodiment enables to determine the tendency of behavior of the at least one person Px of the plurality of persons P1, P2, ..., Pn, without having to monitor the premises 2 thoroughly by the image sensors M1, M2, ..., Mn.

In the present embodiment, the premises 2 is a premises of a school and the plurality of persons P1, P2, ..., Pn are students at the school.

Figure 2:
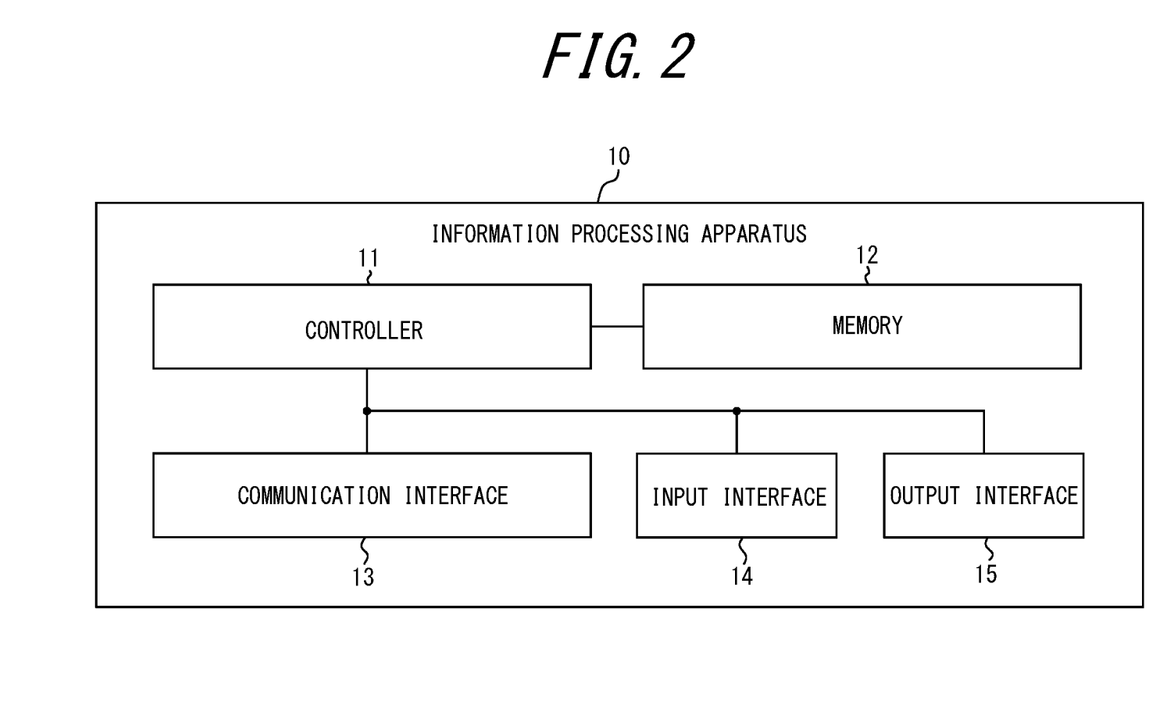
FIG. 2 is a block diagram illustrating a configuration of an information processing apparatus according to an embodiment of the present disclosure.

A configuration of the information processing apparatus 10 according to the present embodiment will be described with reference to FIG. 2.

The information processing apparatus 10 includes a controller 11, a memory 12, a communication interface 13, an input interface 14, and an output interface 15.

The controller 11 includes at least one processor, at least one dedicated circuit, or a combination thereof. The processor is a general purpose processor such as a CPU or a GPU, or a dedicated processor that is dedicated to specific processing. The term "CPU" is an abbreviation of central processing unit. The term "GPU" is an abbreviation of graphics processing unit. The dedicated circuit is, for example, an FPGA or an ASIC. The term "FPGA" is an abbreviation of field-programmable gate array. The term "ASIC" is an abbreviation of application specific integrated circuit. The controller 11 executes processing related to the operation of the information processing apparatus 10 while controlling each component of the information processing apparatus 10.

The memory 12 includes at least one semiconductor memory, at least one magnetic memory, at least one optical memory, or a combination of at least two of these. The semiconductor memory is, for example, RAM or ROM. The term "RAM" is an abbreviation of random access memory. The term "ROM" is an abbreviation of read only memory. The RAM is, for example, SRAM or DRAM. The term "SRAM" is an abbreviation of static random access memory. The term "DRAM" is an abbreviation of dynamic random access memory. The ROM is, for example, EEPROM. The term "EEPROM" is an abbreviation of electrically erasable programmable read only memory. The memory 12 functions as, for example, a main memory, an auxiliary memory, or a cache memory. The memory 12 stores data for use in the operation of the information processing apparatus 10 and data obtained by the operation of the information processing apparatus 10.

The communication interface 13 includes at least one interface for communication. The interface for communication is, for example, a LAN interface. The communication interface 13 receives data for use in the operation of the information processing apparatus 10, and transmits data obtained by the operation of the information processing apparatus 10.

The input interface 14 includes at least one interface for input. The interface for input is, for example, a physical key, a capacitive key, a pointing device, a touch screen integrally provided with a display, or a microphone. The input interface 14 accepts an operation of inputting data for use in the operation of the information processing apparatus 10. Instead of being included in the information processing apparatus 10, the input interface 14 may be connected to the information processing apparatus 10 as an external input device. As the connection method, any technology such as USB, HDMI® (HDMI is a registered trademark in Japan, other countries, or both), or Bluetooth® (Bluetooth is a registered trademark in Japan, other countries, or both) can be used. The term "USB" is an abbreviation of Universal Serial Bus. The term "HDMI®" is an abbreviation of High-Definition Multimedia Interface.

The output interface 15 includes at least one interface for output. The interface for output is, for example, a display or a speaker. The display is, for example, an LCD or an organic EL display. The term "LCD" is an abbreviation of liquid crystal display. The term "EL" is an abbreviation of electro luminescence. The output interface 15 outputs data obtained by the operation of the information processing apparatus 10. Instead of being included in the information processing apparatus 10, the output interface 15 may be connected to the information processing apparatus 10 as an external output device. As the connection method, any technology such as USB, HDMI®, or Bluetooth® can be used.

The functions of the information processing apparatus 10 are realized by executing the information processing program according to the present embodiment by a processor as the controller 11. That is, the functions of the information processing apparatus 10 are realized by software. The information processing program causes the computer to function as the information processing apparatus 10 by causing the computer to execute the operation of the information processing apparatus 10. That is, the computer functions as the information processing apparatus 10 by executing the operation of the information processing apparatus 10 in accordance with the information processing program.

The program can be stored in a non-transitory computer readable medium. The non-transitory computer readable medium is, for example, flash memory, a magnetic recording device, an optical disc, a magneto-optical recording medium, or ROM. The program is distributed, for example, by selling, transferring, or lending a portable medium such as an SD card, a DVD, or a CD-ROM in which the program is stored. The term "SD" is an abbreviation of Secure Digital. The term "DVD" is an abbreviation of digital versatile disc. The term "CD-ROM" is an abbreviation of compact disc read only memory. The program may be distributed by storing the program in a storage of a server and transferring the program from the server to another computer. The program may be provided as a program product.

For example, the computer temporarily stores, in a main memory, a program stored in a portable medium or a program transferred from a server. Then, the computer reads the program stored in the main memory using a processor, and executes processing in accordance with the read program using the processor. The computer may read a program directly from the portable medium and execute processing according to the program. Each time a program is transferred from a predetermined server to the computer, the computer may execute processing according to the received program in order. The processing may be executed through a so-called ASP-type service which implements functions merely by execution of instructions and acquisition of results, without transferring a program from the predetermined server to the computer. The term "ASP" is an abbreviation of application service provider. Programs encompass information for use in processing by a computer and is thus equivalent to a program. For example, data which is not a direct instruction to a computer but has properties that define the processing of the computer corresponds to the "information equivalent to a program" in this context.

Some or all of the functions of the information processing apparatus 10 may be realized by a dedicated circuit as the controller 11. That is, some or all of the functions of the information processing apparatus 10 may be realized by hardware.

Figure 3:
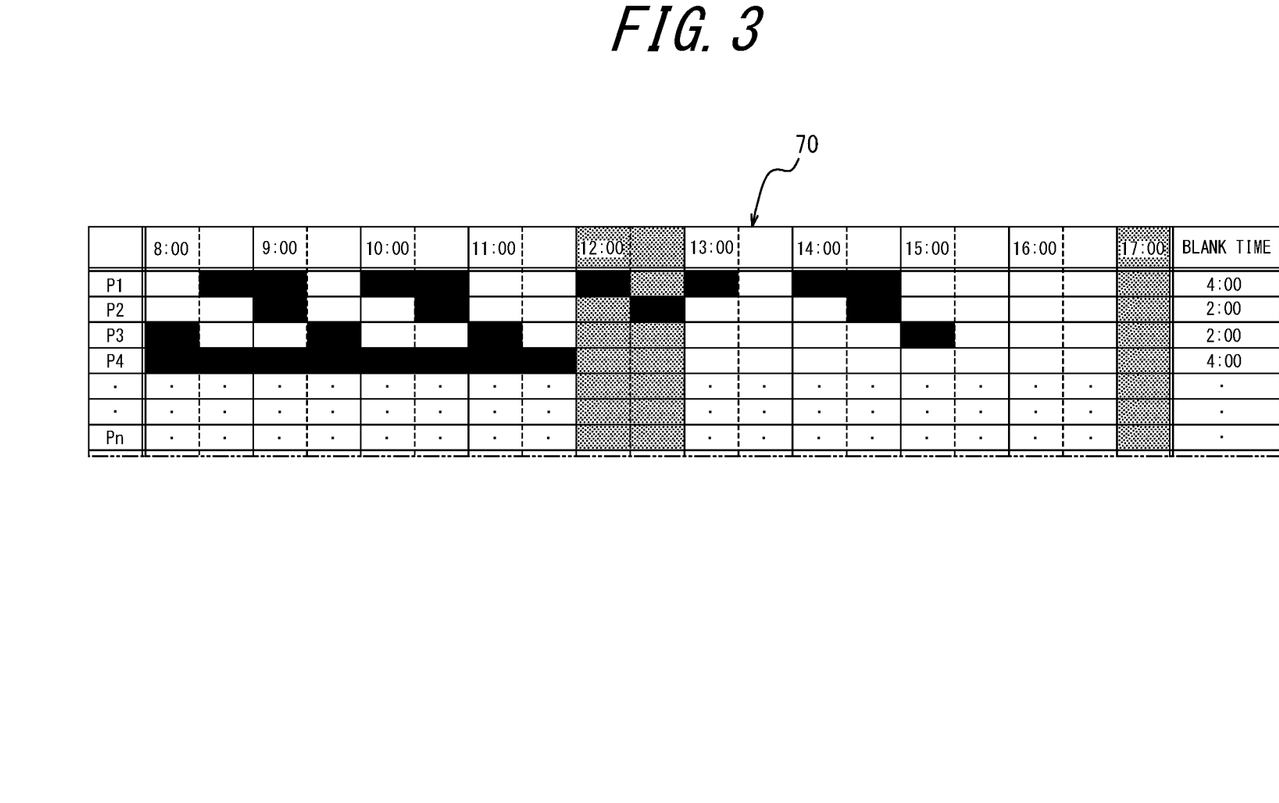
FIG. 3 is an example of a table according to an embodiment of the present disclosure.

With reference to FIG. 3, a description is given of a configuration example of a table which stores a blank time for each of the plurality of persons P1, P2, . . . , Pn. The blank time herein refers to a time period during which any of the persons P1, P2, . . . , Pn does not appear in the image captured by any of the image sensors M1, M2, . . . , Mn.

In the present embodiment, the table 70 of FIG. 3 stores a record for each of the plurality of persons P1, P2, . . . , Pn, as a student Pi. The record is a log of a blank time during which the student Pi does not appear in any of the images captured by the image sensors M1, M2, . . . , Mn. In the record for the student Pi, an identifier "Pi" that identifies the student Pi is also recorded. The blank time recorded in the record for the student Pi is a blank time occurred between 8:00 and 17:30 of a day that the student Pi spends at school. In the table 70, the blank time is filled with black.

The blank time for the student Pi is a time period during which the student Pi is in the blind spot of the image sensors M1, M2, . . . , Mn. For example, the blank time for the student Pi is a time period during which the student Pi, who has left class, stays in the blind spot of the image sensors M1, M2, . . . , Mn such as behind a gymnasium, and thus the student Pi does not appear in the images captured by the image sensors M1, M2, . . . , Mn.

A student who do not appear in the images may be identified by any method. As one method, for example, the controller 11 of the information processing apparatus 10 refers to, for example, a database storing face images of each student at the school, and performs face recognition, to thereby determine the student appearing in the images. The controller 11 collates the list of the students P1, P2, . . . , Pn who are enrolled in the school with a result of identifying each student appearing in the images, and specifies the student who does not appear in the images. For example, when a student P1 who is listed in the name list at the school is not included in the students P2, . . . , Pn appearing in the images captured by the image sensors M1, M2, . . . , Mn, the controller 11 determines that the student P1 does not appear in the images.

In the table 70, in the first row record indicated by the identifier "P1" that identifies the student P1, the blank times of the student P1 include time periods of from 8:30 to 9:30, from 10:00 to 11:00, from 12:00 to 12:30, from 13:00 to 13:30, and from 14:00 to 15:00. In the second row record indicated by the identifier "P2" that identifies the student P2, the blank time for the student P2 includes time periods of from 9:00 to 9:30, from 10:30 to 11:00, from 12:30 to 13:00, and from 14:30 to 15:00. In the third row record indicated by the identifier "P3" that identifies the student P3, the blank time for the student P3 includes time periods of from 8:00 to 8:30, from 9:30 to 10:00, from 11:00 to 11:30, and from 15:00 to 15:30. In the fourth row record indicated by the identifier "P4" that identifies the student P4, the blank time for the student P4 includes a time period of from 8:00 to 12:00.

Figure 4:
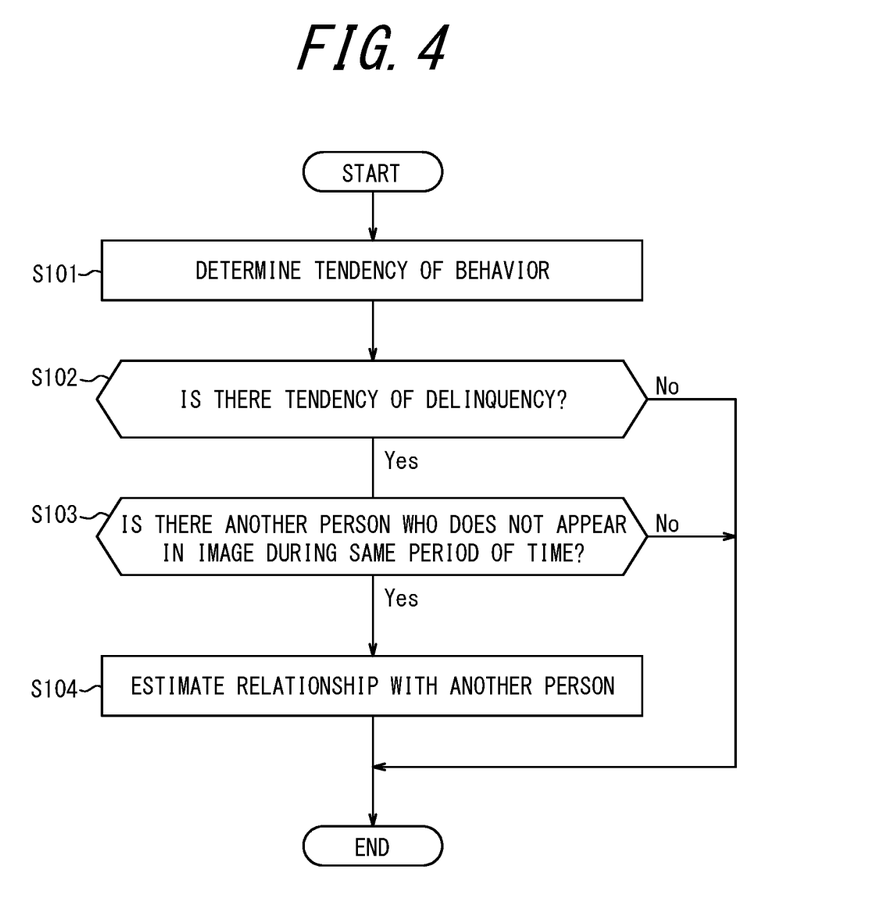
FIG. 4 illustrates an operation of an information processing system according to an embodiment of the present disclosure.

Operations of the information processing system 1 according to the present embodiment will be described with reference to FIG. 4. These operations correspond to the information processing method according to the present embodiment.

In the present embodiment, the controller 11 of the information processing apparatus 10 monitors the plurality of students P1, P2, . . . , Pn in the premises 2 of a school by the image sensors M1, M2, . . . , Mn installed on the premises 2.

In Step S101, the controller 11 of the information processing apparatus 10 determines a tendency of behavior of at least one student Px of the plurality of students P1, P2, . . . , Pn according to the length of a blank time, the blank time being a time period during which the student Px does not appear in an image captured by the image sensors M1, M2, . . . , Mn.

The controller 11 of the information processing apparatus 10 refers to the table 70 of FIG. 3, and determines the tendency of behavior of the student Px according to the blank time for the student Px. The controller 11 determines, as the tendency of behavior, whether the student Px has a tendency of delinquency. When the length of the blank time for the student Px is equal to or greater than a threshold, the controller 11 determines that the student Px has a tendency of delinquency. In the present embodiment, the "tendency of delinquency" refers to that the student is highly likely to be violating school regulations. Examples of the delinquency include smoking, drinking alcohol, violence, or bullying. Delinquency is usually done out of surveillance. When the student Px is in the blind spot of the image sensors M1, M2, . . . , Mn, such as behind a gymnasium, the student Px is suspected to have an intention to sneak out of surveillance. Such intention is highly suspected when the time period during which the student Px is in the blind spot is long enough to be equal to or greater than a threshold. Thus, the controller 11 determines that the student Px has the tendency of delinquency.

In the present embodiment, the threshold is one hour. Assuming that the identifier of the student Px is "P1", the length of the blank time for the student Px is four hours according to the table 70 of FIG. 3. Thus, the length of the blank time for the student Px is equal to or greater than the threshold. Therefore, the controller 11 of the information processing apparatus 10 determines that the student Px has the tendency of delinquency.

The controller 11 of the information processing apparatus 10 performs the processing of Step S101 for each of all the students enrolled in the school and determines whether the student has a tendency of delinquency. In the example of FIG. 3, the length of the blank time for each of the student P1, the student P2, the student P3, and the student P4 is equal to or greater than the threshold. Thus, the controller 11 determines that the student P1, the student P2, the student P3, and the student P4 each have the tendency of delinquency.

In Step S102, the controller 11 of the information processing apparatus 10 refers to the determination result of Step S101. When two or more students have been determined as the student Px to have the tendency of delinquency, the controller 11 performs the processing of Step S103 for at least one student Py of the two or more students. When two or more students have not been determined as the student Px to have the tendency of delinquency, the controller 11 ends the flow of FIG. 4.

In Step S103, the controller 11 of the information processing apparatus 10 compares the blank time for the student Py with the blank time for a student Pw other than the student Py, the student Pw being determined as having the tendency of delinquency in Step S102, and determines whether the blank time for the student Py overlaps with the blank time for the student Pw. Assuming that the identifier of the student Py is "P1" and the identifier of the student Pw is "P2", the controller 11 compares the blank time for the student P1 with the blank time for the student P2. According to the table 70 of FIG. 3, the blank time for the student P1 overlaps with the blank time for the student P2 at the time periods of between 9:00 and 9:30, between 10:30 and 11:00, and between 14:30 and 15:00. Therefore, the controller 11 identifies the student P2 as another student whose blank time overlaps with that for the student P1.

The controller 11 of the information processing apparatus 10 performs the processing of Step S103 for each of all the students other than the student Py, who have been determined as having the tendency of delinquency in Step S102, and identifies other students whose blank time overlaps with that for the student Py. Assuming that the identifier of the student Py is "P1", the controller 11 identifies, in the example of FIG. 3, the student P2 and the student P4 as the other students whose blank time overlaps with that for the student P1.

When the controller 11 of the information processing apparatus 10 has identified one or more other students whose blank time overlaps with that for the student Py, the controller 11 performs the processing of Step S104 for at least one student Pz among the one or more other students. When none of the students has been identified as the other student whose blank time overlaps with that for the student Py, the controller 11 ends the flow of FIG. 4.

In Step S104, the controller 11 of the information processing apparatus 10 estimates the relationship between the student Py and the student Pz who has been identified as the other student whose blank time overlaps with that for the student Py in Step S103. The controller 11 estimates, as the relationship, a relation between a perpetrator and a victim. Specifically, the controller 11 estimates, as the relation between a perpetrator and a victim between the student Py and the student Pz, whether there is a bullying relation between the student Py and the student Pz.

In the present embodiment, the controller 11 of the information processing apparatus 10 compares a first blank time with a second blank time, the first blank time being the blank time for the student Py, the second blank time being the blank time for the student Pz, to thereby estimate, as the relation between a perpetrator and a victim, whether the student Py or the student Pz is doing harm to the other. In the relation between a perpetrator and a victim, a party who does harm is the perpetrator, and a party who is done harm is the victim. In the present embodiment, the "harm" includes verbal and other forms of mental and psychological abuse, as well as physical assault or injury through violence. In the case of estimating whether there is a bullying relation as the relation between a perpetrator and a victim, the controller 11 estimates which of the student Py and the student Pz is bullying the other. Assuming that the identifier of the student Py is "P1" and the identifier of the student Pz is "P2", the controller 11 compares the blank time for the student P1 with the blank time for the student P2 to thereby estimate whether the student P1 is bullying the student P2 or whether the student P2 is bullying the student P1.

Specifically, when the first blank time is longer than the second blank time, the controller 11 of the information processing apparatus 10 estimates that the student Py is doing harm to the student Pz. That is, the controller 11 estimates that the student Py is bullying the student Pz. In the estimation of the relation between a perpetrator and a victim, the student Py who is doing harm is estimated as the perpetrator and the student Pz who is being done harm is estimated as the victim. This is because it is suspected that the student Py having a longer blank time has committed delinquency such as leaving class at its own will, whereas the student Pz having a shorter blank time and the blank time overlaps with the blank time for the student Py has been forced by the student Py to commit delinquency. Assuming that the identifier of the student Py is "P1" and the identifier of the student Pz is "P2", the controller 11 estimates that the student P1 is doing harm to the student P2 when the blank time for the student P1 is longer than the total of the blank time for the student P2. That is, the controller 11 estimates that the student P1 is bullying the student P2. Referring to the table 70 of FIG. 3, the total blank time for the student P1 is four hours and the total blank time for the student P2 is two hours. This means that the first blank time is longer than the second blank time. Thus, the controller 11 estimates that the student P1 is doing harm to the student P2. That is, the controller 11 estimates that the student P1 is bullying the student P2.

As described above, in the present embodiment, when a first person and a second person have been determined as the at least one student Px to have the tendency of delinquency and the first blank time overlaps with the second blank time, the first blank time being the blank time for the first person, the second blank time being the blank time for the second person, the controller 11 of the information processing apparatus 10 estimates a relationship between the first person and the second person with reference to the tendency of behavior determined.

The present embodiment enables to estimate which of the first person and the second person, who have been both determined as having the tendency of delinquency, is the perpetrator, and thus the tendency of behavior can be determined more specifically.

As a modification of the present embodiment, the controller 11 of the information processing apparatus 10 may determine the tendency of behavior of the at least one student Px according to the length of time obtained by excluding a specific time from the blank time for the student Px, the specific time being a time period specified in advance as not resulting from the delinquency. The specific time is, for example, a time to be uniformly excluded for the student P1 to the student Pn, such as a lunch break. Alternatively, the specific time is a time period for which there is a justifiable reason for the student Px not to appear in the image, such as a time period for which the absence of the student Px has been previously notified by a parent of the student Px to a teacher at the school.

Specifically, in the table 70 of FIG. 3, the controller 11 of the information processing apparatus 10 subtracts, as the specific time, a blank time to be uniformly excluded for the student P1 to the student Pn, from the total of the blank time calculated for the student Px. Assuming that the identifier of the student Px is "P1", the blank time for the student P1 is four hours in the record indicated by the identifier "P1" in the table 70 of FIG. 3. However, the blank time for the student P1 includes a lunch break for 30 minutes from 12:00 to 12:30. Therefore, the controller 11 subtracts the 30 minutes as the specific time, from the total of the blank time for the student P1.

Alternatively, the controller 11 of the information processing apparatus 10 subtracts, as the specific time, a blank time for which there is a justifiable reason for the student Px not to appear in the image, from the total of the blank time calculated for the student Px in the table 70. Assuming that the identifier of the student Px is "P4", the record indicated by the identifier "P4" in the table 70 of FIG. 4 has four hours of blank time from 8:00 to 12:00; however, in a case in which a parent of the student P4 has informed in advance a teacher at the school that the student P4 will be late for school, the controller 11 subtracts the four hours as a specific time from the total of the blank time for the student P4. As a result, the blank time for the student P4 will be 0 hour, and the student P4 will be determined as having no tendency of delinquency.

According to the present modification, the specific time is not calculated as the blank time, the specific time being a time in which at least one student Px does not appear in the image for such reasons as a lunch break, after school, being late for school, having left school early, or being absent from school. Thus, the tendency of behavior can be determined more accurately.

As a modification of the present embodiment, the controller 11 of the information processing apparatus 10 may estimate that the first person is doing harm to the second person when the occurrence frequency of the first blank time is higher than the occurrence frequency of the second blank time. For example, when the occurrence frequency of the blank time for the student Py is higher than the occurrence frequency of the blank time for the student Pz, the controller 11 may estimate that the student Py is doing harm to the student Pz. This is because it is suspected that the student Py, who has more blank time, has committed delinquency such as leaving class at its own will, whereas the student Pz, which has less blank time and the blank time overlaps with the blank time for the student Py, has been forced by the student Py to commit delinquency. In the example of FIG. 3, in the table 70, the occurrence frequency of the blank time for the student P1 is five times from 8:30 to 9:30, from 10:00 to 11:00, from 12:00 to 12:30, from 13:00 to 13:30, and from 14:00 to 15:00, while the occurrence frequency of the blank time for the student P2 is four times from 9:00 to 9:30, from 10:30 to 11:00, from 12:30 to 13:00, and from 14:30 to 15:00. Therefore, the controller 11 determines that the occurrence frequency of the first blank time is higher than the occurrence frequency of the second blank time, and estimates that the student P1 is doing harm to the student P2.

As a modification of the present embodiment, the controller 11 of the information processing apparatus 10 may determine the tendency of behavior, according to a result of analysis of an image captured during when the at least one student Px is appearing in the image and the length of the blank time for the at least one student Px. Specifically, the controller 11 may analyze an image captured during when the student Px is appearing in the image, and determine the tendency of behavior based on whether the behavior or the attitude of the student Px matches a predetermined type determined in advance. For example, in a case of determining a tendency of bullying as the tendency of behavior, patterns of behavior such as "ridicule", "inhibition", "imperative communication", "slander", and "coercion" may be determined in advance as the tendency of behavior of a person who bullies others. When it is determined that such patterns of behavior are included in the behavior or attitude of the student Px who appears in the image, the controller 11 may determine that the student Px is bullying another student. As another modification of the present embodiment, patterns of behavior such as "frightening", "screaming", "dependent type communication", "crying", and "injury" may be determined in advance as the tendency of behavior of a person to be bullied. When it is determined that such patterns of behavior are included in the behavior or attitude of the student Px who appears in the image, the controller 11 may determine that the student Px is being bullied by another student.

As a modification of the present embodiment, the controller 11 of the information processing apparatus 10 may further output the result of having determined the tendency of behavior for the plurality of students P1, P2, . . . , Pn, as information related to the guidelines for instructing the plurality of students P1, P2, . . . , Pn. Specifically, as the information related to the guidelines for instructing the students P1, P2, . . . , Pn, the controller 11 may generate, for example, information indicating a level of at least one of the tendency of delinquency and the tendency of bullying as the result of having determined the tendency of behavior for each of the students P1, P2, . . . , Pn, and output the generated information. The controller 11 may transmit the generated information to, for example, a terminal of an organization in charge of the student affairs such as a department of education affairs or student affairs at school, or a terminal of a teacher who belongs to such organization, via the communication interface 13. According to the present modification, the tendency of behavior of the students P1, P2, . . . , Pn can be utilized for instructing the students, and delinquency can be prevented.

The present disclosure is not limited to the embodiments described above. For example, a plurality of blocks described in the block diagrams may be integrated, or a block may be divided. Instead of executing a plurality of steps described in the flowcharts in chronological order in accordance with the description, the plurality of steps may be executed in parallel or in a different order according to the processing capability of the apparatus that executes each step, or as required. Other modifications can be made without departing from the spirit of the present disclosure.

The invention claimed is:

1. An information processing apparatus configured to monitor a plurality of persons within premises using one or more image sensors installed on the premises, the information processing apparatus comprising:
  a communication interface configured to communicate with the one or more image sensors and a terminal via a network;
  a memory configured to store a record for Pi where Pi is each person of the plurality of persons; and
  a controller configured to:
    receive images captured by the one or more image sensors from the one or more image sensors via the communication interface;
    refer to a database storing a face image of Pi and perform face recognition to classify the received images into first images in which Pi appears and second images in which Pi does not appear;
    record a blank time in the record for Pi, the blank time being a time period during which the second images are captured by the one or more image sensors;
    analyze the first images to determine whether attitude or behavior of Pi while the first images are captured by the one or more image sensors includes a predetermined pattern, the predetermined pattern being a pattern of bullying or a pattern of being bullied; and
    transmit, to the terminal via the communication interface, a result of determining a tendency of behavior of Pi according to a length of the blank time recorded in the record for Pi and whether the attitude or behavior of Pi includes the predetermined pattern.

2. An information processing apparatus configured to monitor a plurality of persons within premises using one or more image sensors installed on the premises, the information processing apparatus comprising:
  a communication interface configured to communicate with the one or more image sensors and a terminal via a network,
  a memory configured to store a record for Pi where Pi is each person of the plurality of persons; and
  a controller configured to:
    receive images captured by the one or more images sensors from the one or more image sensors via the communication interface;
    refer to a database storing a face image of Pi and perform face recognition to classify the received images into first images in which Pi appears and second images in which Pi does not appear;
    record a blank time in the record for Pi, the blank time being a time period during which the second images are captured by the one or more image sensors;
    record a specific time in the record for Pi, the specific time being a time period specified in advance as not resulting from delinquency; and
    transmit, to the terminal via the communication interface, a result of determining a tendency of behavior of Pi according to a length of time obtained by excluding the specific time recorded in the record for Pi from the blank time recorded in the record for Pi.

3. An information processing apparatus configured to monitor a plurality of persons within premises using one or more image sensors installed on the premises, the information processing apparatus comprising:
  a communication interface configured to communicate with the one or more image sensors and a terminal via a network;
  a memory configured to store a record for Pi where Pi is each person of the plurality of persons; and
  a controller configured to:
    receive images captured by the one or more image sensors from the one or more image sensors via the communication interface;
    refer to a database storing a face image of Pi and perform face recognition to classify the received images into first images in which Pi appears and second images in which Pi does not appear;
    record a blank time in the record for Pi, the blank time being a time period during which the second images are captured by the one or more image sensors; and
    transmit, to the terminal via the communication interface, a result of determining a tendency of behavior of Pi according to a length of the blank time recorded in the record for Pi,
  wherein upon determining that, as the tendency of behavior of Pi, a first person and a second person of the plurality of persons have a tendency of delinquency and that, as the blank time recorded in the record for Pi, a first blank time for the first person and a second blank time for the second person overlap with each other, the controller is configured to estimate a relationship between the first person and the second person with reference to the tendency of delinquency.

4. The information processing apparatus according to claim 3, wherein the controller is configured to estimate, as the relationship, a relation between a perpetrator and a victim.

5. The information processing apparatus according to claim 4, wherein the controller is configured to estimate, by comparing the first blank time and the second blank time, which of the first person and the second person is doing harm to the other, as the relation between the perpetrator and the victim.

6. The information processing apparatus according to claim 5, wherein the controller is configured to estimate that the first person is doing harm to the second person when the first blank time is longer than the second blank time.

7. The information processing apparatus according to claim 5, wherein the controller is configured to estimate that the first person is doing harm to the second person when occurrence frequency of the first blank time is higher than occurrence frequency of the second blank time.

* * * * *